United States Patent [19]
Rahn et al.

[11] Patent Number: 5,161,914
[45] Date of Patent: Nov. 10, 1992

[54] SLOTTED EXTRACTION TRENCH REMEDIATION SYSTEM

[76] Inventors: Phillip L. Rahn, P.O. Box 50328, Raleigh, N.C. 27650; Larry L. Chandler, 6811 Spencer Dixon Rd., Greensboro, N.C. 27405

[21] Appl. No.: 795,297

[22] Filed: Nov. 20, 1991

Related U.S. Application Data

[63] Continuation of Ser. No. 527,130, May 22, 1990, abandoned.

[51] Int. Cl.$^5$ .............................................. B09B 1/00
[52] U.S. Cl. ..................................... 405/128; 405/258
[58] Field of Search ............... 405/52, 128, 129, 258, 405/265; 210/170, 747; 166/51, 268, 272, 276, 278, 369

[56] References Cited

U.S. PATENT DOCUMENTS

| | | | |
|---|---|---|---|
| Re. 33,102 | 10/1989 | Visser | 166/267 |
| 4,543,016 | 9/1985 | Tallard | 405/129 X |
| 4,593,760 | 6/1986 | Visser et al. | 166/313 X |
| 4,665,989 | 5/1987 | Wilson | 166/302 |
| 4,702,316 | 10/1987 | Chung et al. | 166/272 |
| 4,722,395 | 2/1988 | Venkatesan | 166/272 X |
| 4,793,415 | 12/1988 | Holmes et al. | 166/278 X |
| 4,832,122 | 5/1989 | Corey et al. | 166/266 |
| 4,842,448 | 6/1989 | Koerner et al. | 405/258 |
| 4,848,460 | 7/1989 | Johnson et al. | 210/747 X |
| 4,849,360 | 7/1989 | Norris et al. | 405/128 X |
| 4,863,312 | 9/1989 | Cavalli | 405/128 |
| 4,953,619 | 9/1990 | Dullien et al. | 166/268 X |

OTHER PUBLICATIONS

Cleanup of Releases from Petroleum USTs, U.S. Environmental Protection Agency, Wash. D.C. Apr. 1988.
Connor, R. 1988, Case Study of Soil Venting, Pollution Engineering, 20(7):74-78.
Hutzler, N., 1990, Soil Vapor Extraction of Organic Chemicals, Int'l Symposium on Hazardous Waste Treat.
Terra Va in Situ Vacuum Extraction System U.S. Environmental Protection Agency, Cinc., Ohio, Jul. 1988.

*Primary Examiner*—Randolph A. Reese
*Assistant Examiner*—John A. Ricci
*Attorney, Agent, or Firm*—Rhodes, Coats & Bennett

[57] ABSTRACT

A system for recovering VOC contaminants from a surface or subsurface release. In one embodiment, the invention includes at least one horizontal trench having a perforated casing laid therein. One end of the casing is attached to a vacuum pump by means of a vertical riser. Clean stone is laid over the pipe to form an elongated collector and the surface of the trench is capped to minimize surface air and water infiltration. A suitable vacuum is applied and the VOC contaminates migrate first into the stone within the trench and then into the horizontal casing(s). The VOC contaminants move along the casings and up the vertical riser into a suitable container or directly discharged into the air. In a second embodiment, intermediate ones of the horizontal trenches are pressurized either by air or liquid fluids in either a heated or unheated state to improve the rate of migration of the VOC contaminates into the other alternating ISVE trenches exerting a negative pressure. In a third embodiment, vertical wells are used as the source of the pressurized fluid in place of the intermediate horizontal trenches.

13 Claims, 3 Drawing Sheets

SLOTTED EXTRACTION TRENCH REMEDIATION SYSTEM

BACKGROUND OF THE INVENTION

1. Field of the Invention

The present invention generally relates to remediation of soil contaminated by volatile organic compounds, and in particular to a system for in-situ soil vacuum extraction of the contaminates and the process thereof.

2. Description of the Prior Art

Conventional methods of removing contamination from groundwater and soils include excavating the contaminated subsurface material and pumping contaminated water from subsurface materials to the surface for treatment. Both methods are expensive due to the volume of material which must be removed, treated, and disposed.

In-situ soil vacuum extraction (ISVE) involves the removal of volatile organic compounds (VOC's). Dissolved VOC's are present in the upper, unsaturated "vadose" zone above the groundwater. The dissolved VOC's approach an equilibrium concentration in the soil's pore space according to Henry's Law.

The contaminates can be aliphatic and/or aromatic hydrocarbons, halogenated hydrocarbons, or other volatile organic compounds. Many of these compounds have vapor pressures of at least 20 mmHg at room temperature. Accordingly, such compounds can be easily volatilized when subjected to a suitable vacuum or air flow.

The design and operation of ISVE remediation systems are based on the movement of gases in a porous media. Thus, a negative air pressure gradient exerted on the soil will induce migration of the subsurface VOC's. The VOC's can then be collected at extraction point(s) and discharged and collected at the surface. Accordingly, an ISVE remediation system must be designed in accordance with site specific subsurface conditions in order to maximize the rate of contaminant removal.

ISVE remediation systems may be either vertical or horizontal wells. Vertical systems become cost competitive with excavation and removal when the vadose zone exceeds about 20 feet in depth. Horizontal systems are more effective where contaminates are very shallow, i.e. less than about 20 feet. However, vertical well systems are prone to plugging.

The vacuum at the wellhead of conventional ISVE remediation systems is directly related to the range of influence (ROI) at the well and, therefore, the rate of removal of VOC's from the site. In addition, it is well known that the spacing of the wells between one another of conventional ISVE remediation systems is critical to the overall performance of the ISVE remediation system. This is due, in part, because the ROI can vary depending on the soil type and depth of groundwater.

For example, Malot and Wood applied a ISVE remediation system. at a site in which 15,000 gallons of $CCl_4$ was spilled in an area where the top of the unconfined aquifer was 300 feet below the surface. Slotted pipes were installed at depths of 75 to 180 feet. A vacuum of 29.9 inches of Hg and a flow rate of 240 CFM was applied. After 90 days the vacuum stabilized at a ROI of 10 feet (Malot, James J. and Wood, P. R., "Low Cost, Site Specific, Total Approach to Decontamination", Conference on Environmental and Public Health Effects of Soils Contaminated with Petroleum Products, University of Massachusetts, Amherst, MA. Oct. 30–31, 1985).

U.S. Pat. Nos. 4,593,760 and Re. 33,102 (U.S. Pat. No. 4,660,639), issued to Visser et al., describe one ISVE remediation system for removing VOC's from the vadose zone. Wells are sunk vertically into the vadose zone. The well casing includes a lower perforated region. VOC's in the vadose layer enter the perforated casing and are pumped to the surface for treatment.

U.S. Pat. No. 4,832,122, issued to Corey et al., also describes another ISVE remediation system for removing VOC's from the vadose zone. Two sets of wells are sunk into the vadose zone. One well injects a fluid into the saturated zone below the plume of contamination. A second well, located above the plume, collects the fluid along with the VOC's from the plume, and pumps it to the surface for treatment.

ISVE remediation systems can have a great degree of success removing VOC constituents exhibiting relatively high vapor pressures and under the proper hydrogeologic settings. In addition, ISVE remediation systems are very cost competitive when compared with other alternatives, including physical removal and disposal in a secure landfill. However, conventional ISVE remediation systems perform poorly for areas having relatively high water tables and/or soils with an extremely high clay content.

It has thus become desirable to develop an improved ISVE remediation system for VOC contaminants which is more cost effective than a conventional ISVE remediation systems while, at the same time, eliminating the prior art problems of poor performance in areas having relatively high water tables due to high water lift and/or soils with an extremely high clay content. In addition, the improved ISVE remediation system should have a ROI at least equal or greater than a conventional ISVE remediation system and be less dependent on spacing between adjacent wells.

SUMMARY OF THE INVENTION

The present invention is directed to a system for recovering VOC contaminants from a surface or subsurface release. In one embodiment, the invention includes at least one horizontal trench having a perforated casing laid therein. One end of the casing is attached to a vacuum pump by means of a vertical riser. Clean stone is laid over the pipe to form an elongated collector and the surface of the trench is capped to minimize surface air and water infiltration. A suitable vacuum is applied and the VOC contaminates migrate first into the stone within the trench and then into the horizontal casing(s). The VOC contaminants move along the casings and up the vertical riser into a suitable container or directly discharged into the air.

In a second embodiment, intermediate ones of the horizontal trenches are pressurized either by air or liquid fluids in either a heated or unheated state to improve the rate of migration of the VOC contaminates into the other alternating ISVE trenches exerting a negative pressure.

In a third embodiment, vertical wells are used as the source of the pressurized fluid in place of the intermediate horizontal trenches.

Accordingly, one aspect of the present invention is to provide a system for removing volatile contaminates from the vadose zone of a contaminated area. The system includes: (a) an elongated trench, having a pair of downwardly extending walls and a bottom, adjacent to the contaminated area; (b) a first conduit positioned within the trench, the conduit having a perforated portion for receiving the volatile contaminates; (c) a second conduit connected to the first conduit, the second conduit having a imperforate portion for conducting the volatile contaminates from the first conduit to the surface of the trench; (d) at least the lower portion of the trench adjacent to the contaminated area filled with a permeable fill material, the permeable fill material permitting the volatile contaminates to flow from the contaminated area adjacent to the trench into the first conduit; (e) sealing means upon the upper portion of the trench for preventing the entry air or other fluids from the surface of the trench into the permeable fill material; and (f) pump means connected to the second conduit for pumping the volatile contaminates from the vadose zone, through at least on of the side walls of the trench and the permeable fill material, into the first conduit, and through the second conduit to the surface of the trench.

Another aspect of the present invention is to provide a collector for a system for removing volatile contaminates from the vadose zone of a contaminated area. The collector includes: (a) an elongated trench, having a pair of downwardly extending walls and a bottom, adjacent to the contaminated area; (b) a first conduit positioned within the trench, the conduit having a perforated portion for receiving the volatile contaminates; (c) a second conduit connected to the first conduit, the second conduit having a imperforate portion for conducting the volatile contaminates from the first conduit to the surface of the trench; (d) at least the lower portion of the trench adjacent to the contaminated area filled with a permeable fill material, the permeable fill material permitting the volatile contaminates to flow from the contaminated area adjacent to the trench into the first conduit; and (e) sealing means upon the upper portion of the trench for preventing the entry air or other fluids from the surface of the trench into the permeable fill material.

Still another aspect of the present invention is to provide a system for removing volatile contaminates from the vadose zone of a contaminated area. The system includes: (a) an elongated trench, having a pair of downwardly extending walls and a bottom, adjacent to the contaminated area; (b) a first conduit positioned within the trench, the conduit having a perforated portion for receiving the volatile contaminates; (c) a second conduit connected to the first conduit, the second conduit having a imperforate portion for conducting the volatile contaminates from the first conduit to the surface of the trench; (d) at least the lower portion of the trench adjacent to the contaminated area filled with a permeable fill material, the permeable fill material permitting the volatile contaminates to flow from the contaminated area adjacent to the trench into the first conduit; (e) sealing means upon the upper portion of the trench for preventing the entry air or other fluids from the surface of the trench into the permeable fill material; (f) pump means connected to the second conduit for pumping the volatile contaminates from the vadose zone, through at least one of the side walls of the trench and the permeable fill material, into the first conduit, and through the second conduit to the surface of the trench; and (g) a third conduit positioned adjacent to the trench, the conduit having a perforated portion for supplying a fluid; (h) a fourth conduit connected to the third conduit, the fourth conduit having a imperforate portion for conducting the fluid from the surface of the trench to the third conduit; and (i) second pump means connected to the fourth conduit for pumping the fluid from surface of the trench, through the fourth conduit, into the third conduit, through the permeable fill material and at least one of the side walls of the trench, and the vadose zone, whereby the fluid from the second pump means is drawn across the contaminated area by the pump means so that the volatile contaminates are carried with the fluid to the surface.

These and other aspects of the present invention will become apparent to those skilled in the art after a reading of the following description of the preferred embodiment when considered with the drawings.

DESCRIPTION OF THE PREFERRED EMBODIMENT

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
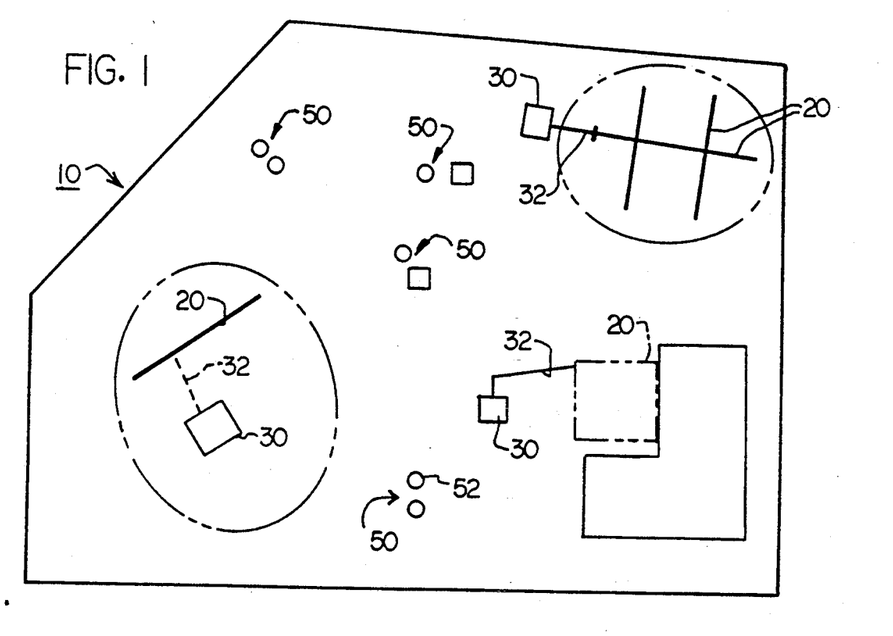
FIG. 1 is a plan view of an industrial site employing ISVE systems constructed according to the present invention.

Referring now to the drawings in general and to FIG. 1 in particular, it will be understood that the illustrations are for the purpose of describing a preferred embodiment of the invention and are not intended to limit the invention thereto. As best seen in FIG. 1, an industrial site, generally designated 10 and employing ISVE remediation systems 12, 14 and 16 constructed according to the present invention, is shown. Each of these systems has a different lay out depending on the site specific hydrogeologic and surface conditions.

Figure 2:
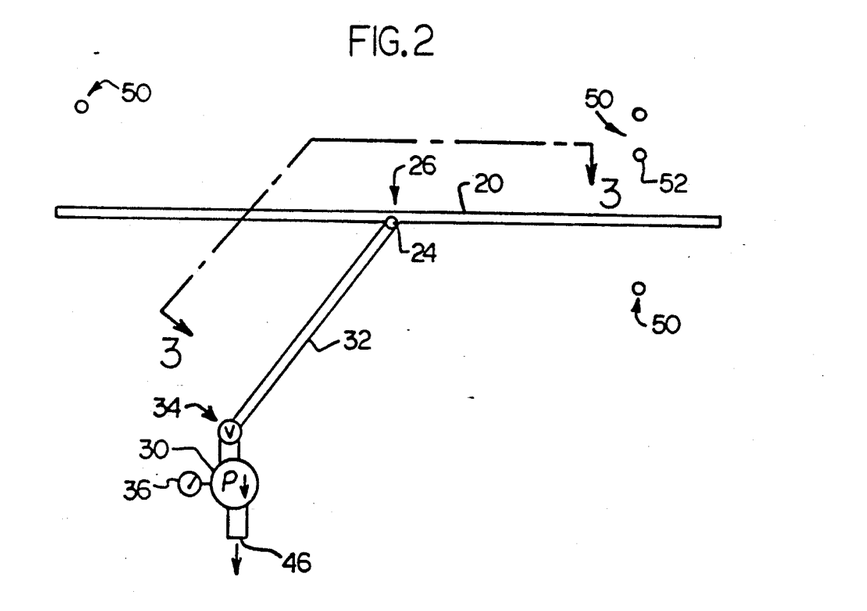
FIG. 2 is a plan view of the SET system shown in FIG. 1 at AREA 5, the view being generally diagrammatic.

FIG. 2 is a plan view of the slotted extraction trench (SET) system 12 shown in FIG. 1 at AREA 5, the view being generally diagrammatic. The primary element of the SET remediation system 12 is the trench 20 itself. The trench 20 of the present invention is first excavated by backhoe. The overall dimensions of the trench 20 were 160 feet long by 15 feet deep. The width of the trench 20 was approximately 18 inches. A 4 inch diameter PVC slotted pipe 22 (not shown) is laid in the bottom of trench 20. A vertical riser 24 of schedule 40 PVC pipe is connected to the 4 inch diameter slotted pipe 20 near its midportion 26.

An oil-less type vacuum pump 30 is connected at the riser 24 by means of conduit 32 for creating a source of negative air pressure. Control of the air flow entering the vacuum pump is by a relief valve 34. The relief valve 34 operates by allowing excess ambient air to enter the vacuum pump 30 in order that the desired negative pressure for the trench 20 can be maintained. A pressure gauge 36 located adjacent to the vacuum pump provides a measurement of the negative pressure at the pump.

The discharge 40 from the vacuum pump may be connected to a suitable sub-system (not shown) for collecting, treating, or disposing of the VOC's. For example, the gas may be collected in a storage tank. The volatile gases also may be discharged into the atmosphere where environmental constraints permit, adsorbed by activated charcoal, or destroyed by incineration.

An exhaust emission and monitoring sub-system (not shown) measures the VOC's on a periodic basis. The periodic measurements of VOC concentration and air velocity at system discharge versus time are used to calculate the total pounds per day of VOC's. The current limit of total VOC per day is dependent on the location of the contaminated site. Secondary means for disposal of VOC's greater than permissible limits include the aforementioned carbon adsorption and incineration.

Several "nests" of vacuum monitoring wells 50 are placed at specific distances and depths with respect to the trench 20 to monitor the ROI of the SET system in the surrounding soil. Each nest includes several monitors 52 each at different depths to measure the pressure differential with respect to adjacent zones. Each monitor 52 consists of a well which is capped at the surface and equipped with a pressure gauge which can be read periodically and used to determine the overall ROI of the SET system with respect to the dimensions of the VOC plume, thereby monitoring the effectiveness of the SET system.

Figure 3:
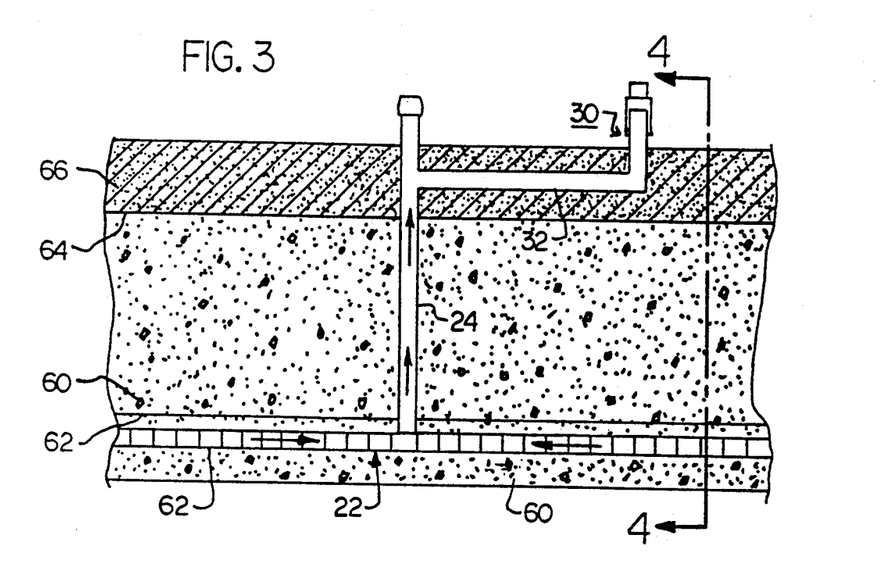
FIG. 3 is an enlarged cross-sectional view of the SET system shown in FIG. 2, taken along line 3-3.

Turning to FIG. 3, there is shown an enlarged cross-sectional view of the SET system shown in FIG. 2, taken along line 3—3. A 6 inch layer of clean stone 60 having an average size of greater than ¼ inches in diameter was placed at the bottom of the trench 20. The 4 inch diameter PVC slotted pipe 22 is laid upon the first layer of stone and the vertical riser 24 is connected to the 4 inch diameter slotted pipe 22 near its midportion. A geo-textile fabric 62 is laid over slotted pipe 22 to limit sand infiltration. A second layer of clean stone 60 is laid over the slotted pipe 22 to within 2–5 feet of the surface or to correspond to the depth of VOC contamination.

Figure 4:
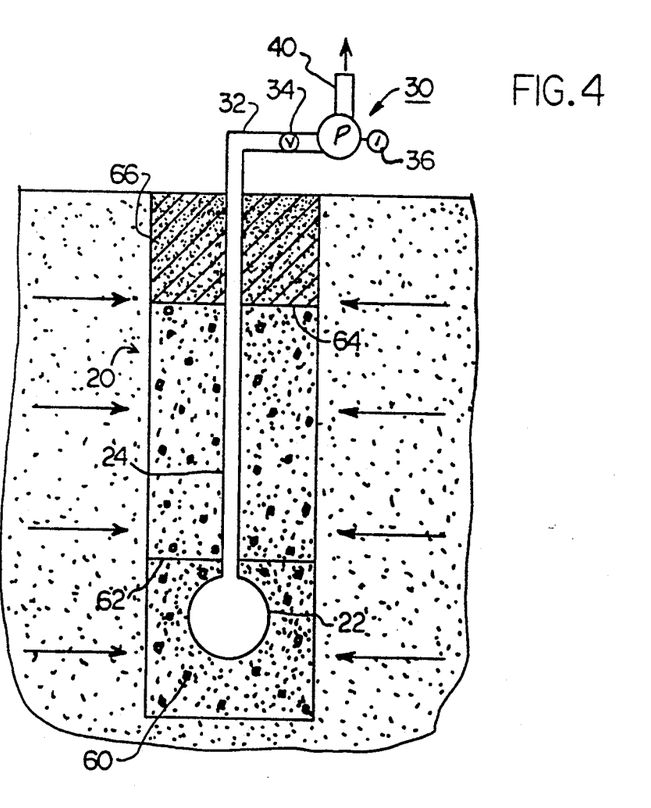
FIG. 4 is an enlarged cross-sectional view of the SET system shown in FIG. 3, taken along line 4—4.

As best seen in FIG. 4, a 6 mil polyethylene sheet 64 is laid over the second clean stone layer to minimize surface air and water from entering the trench. The final 2–5 feet of the trench 20 is filled with a mixture 66 of backfill and bentonite clay to form a water and air resistant cap above the trench. A concrete plug may be added where required for safety. The vacuum pump 30, preferable capable of about 320 CFM at 15 inches of Hg, is then connected to the pipe riser 24 leading to the horizontal slotted pipe 22 in the bottom of the trench 20. The ROI of the SET system 12 is measured by means of monitors 52.

Figure 5:
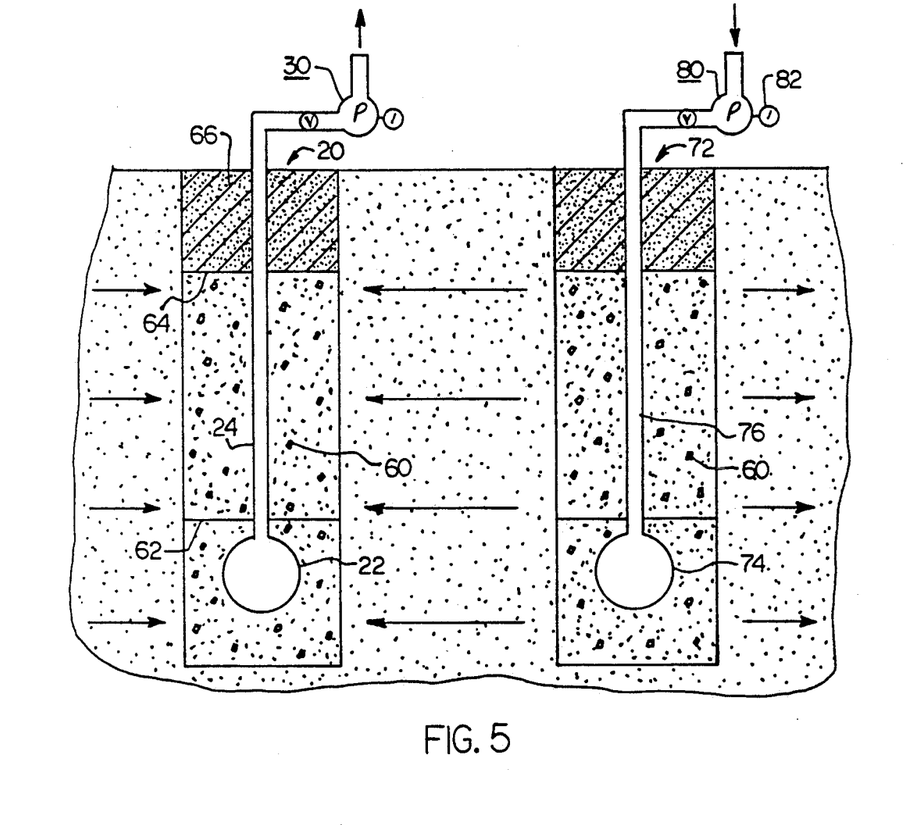
FIG. 5 is an enlarged cross-sectional view of an alternative embodiment of the SET system shown in FIGS. 2-4.

FIG. 5 is an enlarged cross-sectional view of an alternative embodiment of the SET system 12 shown in FIGS. 2 through 4. The primary element of the alternative remediation system is the trench 20 itself and a second trench 72 or vertical well (not shown) for injecting a heated fluid of air or liquid.

Like the unassisted SET system 12, the second trench 72 of the alternative embodiment of the present invention is first excavated by backhoe. A 4 inch diameter PVC slotted pipe 74 is laid in the bottom of trench 72. A vertical riser 76 of schedule 40 PVC pipe is connected to the 4 inch diameter slotted pipe 74 near its midportion. An oil-less type fluid pump 80 is connected at the riser 76 for creating a source of positive air or liquid fluid pressure. A pressure gauge 82 located adjacent to the pump 80 provides a measurement of the pressure at the pump.

Like the unassisted SET system 12, several "nests" of vacuum monitoring wells 50 are placed at specific distances and depths with respect to the trench 20 to monitor the ROI of the SET system in the surrounding soil. Each nest includes several monitors 52 each at different depths to measure the pressure differential with respect to adjacent zones.

The method and apparatus according to the present invention will become more apparent upon reviewing the following detailed examples.

EXAMPLE NO. 1

A 4 inch diameter well was installed to a depth of 15 feet at AREA 1. Slotted PVC pipe was utilized for the bottom 12 feet of the well. A 1 ½ hp vacuum pump capable of 13 CFM at 10 inches of Hg was connected to the well head. The ROI of the well was measured to be 10 feet (314 ft$^2$).

Based on the initial ROI data, twelve additional wells were installed in order to provide coverage for an area of approximately 80 feet by 80 feet (6400 ft$^2$). A second vacuum pump capable of 320 CFM at 15 inches of Hg was then connected to a piping manifold leading to each of the twelve wells. Air flow from well was measured and varied from between about 14 CFM to about 24 CFM.

The effectiveness at the well head of the 4 inch diameter wells was calculated (CFM/2*pi*r*d) based upon a 9 inch diameter bore, 12 feet of effective depth, and a maximum of 24 CFM at 15 inches of Hg to be 0.85 CFM/ft$^2$ of vertical surface area at the well head.

Similarly, the effectiveness at the ROI of the 4 inch diameter wells was calculated (CFM/2*pi*r*d) based upon a 10 feet radius ROI, 12 feet of effective depth, and a maximum of 24 CFM at 15 inches of Hg to be 0.032 CFM/ft$^2$ of vertical surface area at the ROI.

Finally, the surface area effectiveness at the ROI of the 4 inch diameter wells was calculated (pi*r$^2$/CFM*d) based upon the 10 feet radius ROI, 12 feet of effective depth, and a maximum of 24 CFM at 15 inches of Hg to be 1.09 ft$^2$/CFM/ft of horizontal surface area at the ROI.

Utilizing standard EPA cost estimates, such as set out in EPA report EPA 540 A-89-003 (July 1989), the installed cost of this vertical well ISVE system, excluding pumps, should be about $8000.

EXAMPLE NO. 2

A slotted extraction trench (SET) was excavated by backhoe in AREA 5. The overall dimensions of the SET were 160 feet long by 15 feet deep. The width of the trench was approximately 18 inches. A 6 inch layer of clean stone having an average size of greater than ¼ inches in diameter was placed at the bottom of the SET. A 4 inch diameter PVC slotted pipe was laid upon the first layer of stone. A vertical riser of schedule 40 PVC pipe was connected to the 4 inch diameter slotted pipe near its midportion. A geo-textile fabric was laid over the slotted pipe to limit sand infiltration. A second layer of clean stone was laid over the slotted pipe to within 2 ½ feet of the surface. A 6 mil polyethylene sheet was laid over the second clean stone layer to prevent surface air and water from entering the SET. The final 2 ½ feet of the SET was filled with a mixture of backfill and bentonite clay to form a water and air resistant cap above the SET.

A vacuum pump capable of about 320 CFM at 15 inches of Hg was then connected to the pipe riser leading to the horizontal slotted pipe in the bottom of the SET. Air flow was measured and found to be about 320 CFM at only 5 inches of Hg. Estimated CFM at 15 inches of Hg was calculated to be about 600 CFM (CFM =k * (difference in pressure (psi½))). The ROI of the well was measured to be 30 feet on either side of the SET (9600 ft$^2$).

The effectiveness at the trench surface of the SET was calculated (CFM/2dL) based upon a 160 foot length, 12 ½ feet of effective depth, and a maximum of 320 CFM at 5 inches of Hg to be 0.08 CFM/ft$^2$ of vertical surface area at the trench surface. At 15 inches of Hg, the effectiveness at the trench surface was estimated to be about 0.8 CFM/ft$^2$ which is comparable to the vertical well ISVE system in Example 1.

Similarly, the effectiveness at the ROI of the SET was calculated (CFM/2dL) based upon a 160 foot length, 12 ½ feet of effective depth, and a maximum of 320 CFM at 5 inches of Hg to be 0.08 CFM/ft$^2$ of vertical surface area at the ROI. This value is approximately twice the value of the vertical well ISVE system in Example 1 at 10 inches of Hg less than in Example 1.

Finally, the surface area effectiveness at the ROI of the SET was calculated (2rL/CFM*d) based upon the 30 feet range ROI, a 160 foot length, 12 ½ feet of effective depth, and a maximum of 320 CFM at 5 inches of Hg to be 2.4 ft$^2$/CFM/ft of horizontal surface area at the ROI.

Utilizing standard EPA cost estimates, such as set out in EPA report EPA 540 A-89-003 (July 1989), the installed cost of this SET ISVE system, excluding pumps, should be about $4000.

EXAMPLE NO 3

Based on the results for AREAS 1 and 5, above, AREA 1 was retrofitted with a SET system. Three slotted extraction trenches (SET) were excavated by backhoe. The first two SETs were perpendicular to and bisected by the third SET. The overall dimensions of each of the first two SETs were 40 feet long by 15 feet deep. The third SET was 80 feet long by 15 feet deep. The total overall length of the SET system was 160 feet. The width of the trenches were approximately 18 inches. A 6 inch layer of clean stone having an average size of greater than ¼ inches in diameter was placed at the bottom of the SETs. A 4 inch diameter PVC slotted pipe was laid upon the first layer of stone. A vertical riser of schedule 40 PVC pipe was connected to the 4 inch diameter slotted pipes near its midportion. A geo-textile fabric was laid over the slotted pipe to limit sand infiltration. A second layer of clean stone was laid over the slotted pipe to within 2 ½ feet of the surface. A 6 mil polyethylene sheet was laid over the second clean stone layer to prevent surface air and feet of the SET. The final 2 ½ water from entering the SET. The final 2 ½ feet of the SET was filled with a mixture of backfill and bentonite clay to form a water and air resistant cap above the SET.

A vacuum pump capable of about 320 CFM at 15 inches of Hg was then connected to the pipe riser leading to the horizontal slotted pipe in the bottom of the SET. Air flow was measured and found to be about 320 CFM at only 5 inches of Hg. The ROI of the well was measured to be 30 feet on either side of the SET (9600 ft$^2$).

The effectiveness at the trench surface of the SET was calculated (CFM/2dL) based upon a 160 foot length, 12 ½ feet of effective depth, and a maximum of 320 CFM at 5 inches of Hg to be 0.08 CFM/ft of vertical surface area at the trench surface. At 15 inches of Hg, the effectiveness at the trench surface was estimated to be about 0.8 CFM/ft$^2$ which was comparable to the original vertical well ISVE system for AREA 1 as discussed in Example 1.

Similarly, the effectiveness at the ROI of the SET was calculated (CFM/2dL) based upon a 160 foot length, 12 ½ feet of effective depth, and a maximum of 320 CFM at 5 inches of Hg to be 0.08 CFM/ft$^2$ of vertical surface area at the ROI. This value is approximately twice the value of the vertical well ISVE system in Example 1 at 10 inches of Hg less than in Example 1.

Finally, the surface area effectiveness at the ROI of the SET was calculated (2rL/CFM*d) based upon the 30 feet range ROI, a 160 foot length, 12 ½ feet of effective depth, and a maximum of 320 CFM at 5 inches of Hg to be 2.4 ft$^2$/CFM/ft of horizontal surface area at the ROI.

Utilizing standard EPA cost estimates, such as set out in EPA report EPA 540 A-89-003 (July 1989), the installed cost of this SET ISVE system, excluding pumps, was estimated to be about $2000, or one fourth of the installed cost of the original vertical well ISVE system.

EXAMPLE NO. 4

Based on the results for AREAS 1 and 5, above, a third area was fitted with a SET system. A single slotted extraction trench (SET) was excavated by backhoe. The SET was 30 feet long by 14 feet deep. The width of the trenches were approximately 18 inches. A 6 inch layer of clean stone having an average size of greater than ¼ inches in diameter was placed at the bottom of the SET. A 4 inch diameter PVC slotted pipe was laid upon the first layer of stone. A vertical riser of schedule 40 PVC pipe was connected to the 4 inch diameter slotted pipes near its midportion. A geo-textile fabric was laid over the slotted pipe to limit sand infiltration. A second layer of clean stone was laid over the slotted pipe to within 5 feet of the surface. A 6 mil polyethylene sheet was laid over the second clean stone layer to prevent surface air and water from entering the SET. The final 5 feet of the SET was filled with a mixture of backfill and bentonite clay to form a water and air resistant cap above the SET.

A vacuum pump capable of about 50 CFM at 15 inches of Hg was then connected to the pipe riser leading to the horizontal slotted pipe in the bottom of the SET. Air flow was measured and found to be about 46 CFM at only 5 inches of Hg. The ROI of the well was measured to be 30 feet on either side of the SET (2400 ft$^2$).

The effectiveness at the trench surface of the SET was calculated (CFM/2dL) based upon a 30 foot length, 9 feet of effective depth, and a maximum of 46 CFM at 5 inches of Hg to be 0.08 CFM/ft$^2$ of vertical surface area at the trench surface. At 15 inches of Hg, the effectiveness at the trench surface was estimated to be about 0.8 CFM/ft² which was comparable to the original vertical well ISVE system for AREA 1 as discussed in Example 1.

Similarly, the effectiveness at the ROI of the SET was calculated (CFM/2dL) based upon a 30 foot length, 9 feet of effective depth, and a maximum of 46 CFM at 5 inches of Hg to be 0.08 CFM/ft² of vertical surface area at the ROI. This value is approximately *twice* the value of the vertical well ISVE system in Example 1 and at 10 inches of Hg less than in Example 1.

Finally, the surface area effectiveness at the ROI of the SET was calculated (2rL/CFM*d) based upon the 30 feet range ROI, a 30 foot length, 9 feet of effective depth, and a maximum of 46 CFM at 5 inches of Hg to be 4.3 ft²/CFM/ft of horizontal surface area at the ROI.

From the above Examples it is clear that at depths less than 20 feet the SET ISVE system is more effective, more economical to install, achieves faster remediation than a vertical well ISVE. In addition, the high efficiency of the SET ISVE system allows high CFM operation at lower vacuums levels which provides less lift to the ground water, thereby resulting in less waste water entering the vacuum extraction system.

The trench design of the SET ISVE system does not require the high degree of "lapping" required by a vertical well ISVE to provide complete coverage of the contaminated area. Moreover, the seal design of the SET ISVE system minimizes "short circuiting" by surface air and infiltration of surface water. Finally, the combination of the clean stone fill material and the geo-textile fabric around the perforated conduit minimizes plugging by soil infiltration.

In the above Examples, the present invention was directed to removal of VOC's from the vadose zone. However, the present invention also may be used in combination with a system for removing contaminates from contaminated groundwater adjacent to the vadose zone. Thus, one or more pumps can be added to remove groundwater from the aquifer, treat it to remove the contaminates, and return it to the aquifer.

Certain other modifications and improvements will occur to those skilled in the art upon reading of the foregoing description. By way of example, while the SET ISVE system of the present invention has been shown laid out in straight line or criss-cross arrangements, other geometries including serpentine and spiral configurations could be equally desirable, particularly when the contours of the surface and the VOC contaminate plumes are not linear. It should be understood that all such modifications and improvements have been deleted herein for the sake of conciseness and readability but are properly within the scope of the following claims.

We claim:

1. A collector for a system for removing volatile contaminates from the vadose zone of a contaminated area, said collector comprising:
    (a) an elongated trench, having a pair of downwardly extending walls and a bottom, adjacent to said contaminated area;
    (b) a first conduit positioned within said trench, said conduit having a perforated portion for receiving said volatile contaminates;
    (c) a second conduit connected to said first conduit, said second conduit having a imperforate portion for conducting said volatile contaminates from said first conduit to the surface of said trench;
    (d) at least two thirds of the lower portion of said trench adjacent to said contaminated area filled with a gas permeable fill material, said gas permeable fill material permitting said volatile contaminates to flow from said contaminated area adjacent to said trench into said first conduit;
    (e) sealing means upon the upper portion of said trench for preventing the entry air or other fluids from the surface of said trench into said gas permeable fill material;
    (f) a third conduit positioned adjacent to said trench, said third conduit having a perforated portion for supplying a fluid; and
    (g) a fourth conduit connected to said third conduit, said fourth conduit having a imperforate portion for conducting said fluid from the surface of said trench to said third conduit, whereby said fluid is drawn across said contaminated area so that said volatile contaminates are carried with said fluid to the surface, wherein said third conduit includes an elongated trench, having a pair of downwardly extending walls and a bottom, adjacent to said contaminated area; at least the lower portion of said trench adjacent to said contaminated area filled with a gas permeable fill material, said gas permeable fill material permitting said fluid to flow from said fourth conduit into said contaminated area adjacent to said trench; and sealing means upon the upper portion of said trench for preventing the entry air or other fluids from the surface of said trench into said gas permeable fill material.

2. The apparatus according to claim 1, wherein said third conduit includes a borehole, having a downwardly extending aperture and a bottom, adjacent to said contaminated area; at least the lower portion of said borehole adjacent to said contaminated area filled with a gas permeable fill material, said gas permeable fill material permitting said fluid to flow from said fourth conduit into said contaminated area adjacent to said borehole; and sealing means upon the upper portion of said borehole for preventing the entry air or other fluids from the surface of said borehole into said gas permeable fill material.

3. An apparatus for removing volatile contaminates from the vadose zone of a contaminated area, said apparatus comprising:
    (a) an elongated trench, having a pair of downwardly extending walls and a bottom, adjacent to said contaminated area;
    (b) a first conduit positioned within said trench, said conduit having a perforated portion for receiving said volatile contaminates;
    (c) a second conduit connected to said first conduit, said second conduit having a imperforate portion for conducting said volatile contaminates from said first conduit to the surface of said trench;
    (d) at least two thirds of the lower portion of said trench adjacent to aid contaminated area filled with a gas permeable fill material, said gas permeable fill material permitting said volatile contaminates to flow from said contaminated area adjacent to said trench to said first conduit;
    (e) sealing means upon the upper portion of said trench for preventing the entry air or other fluids from the surface of said trench into said gas permeable fill material;

(f) pump means connected to said second conduit for pumping said volatile contaminates from said vadose zone, through at least one of said side walls of said trench and said gas permeable fill material, into said first conduit, and through said second conduit to the surface of said trench;

(g) a third conduit positioned adjacent to said trench, said conduit having a perforated portion for supplying a fluid;

(h) a fourth conduit connected to said third conduit, aid fourth conduit having a imperforate portion for conducting said fluid from the surface of said trench to said third conduit; and (i) second pump means connected to said fourth conduit for pumping said fluid from surface of said trench, through said fourth conduit, into said third conduit, through said gas permeable fill material and at least one of said side walls of said trench, and said vadose zone, whereby said fluid from said second pump means is drawn across said contaminated area by said pump means so that said volatile contaminates are carried with said fluid to the surface, wherein said third conduit includes an elongated trench, having a pair of downwardly extending walls and a bottom, adjacent to said contaminated area; at least the lower portion of aid trench adjacent to said contaminated area filled with a gas permeable fill material, said gas permeable fill material permitting said fluid to flow from said fourth conduit into said contaminated area adjacent to said trench; and sealing means upon the upper portion of aid trench for preventing the entry air or other fluids from the surface of said trench into said gas permeable fill material.

4. The apparatus according to claim 3, wherein said sealing means upon the upper portion of said trench for preventing the entry air or other fluids from the surface of said trench into said gas permeable fill material includes a second fill material of low fluid permeability.

5. The apparatus according to claim 4, wherein said second fill material of low fluid permeability includes a mixture of backfill and bentonite clay.

6. The apparatus according to claim 3, wherein said sealing means upon the upper portion of said trench for preventing the entry air or other fluids from the surface of said trench into said gas permeable fill material includes a sheet of polyethylene plastic above the surface of said trench.

7. The apparatus according to claim 6, further including a third fill material to prevent the movement of said sheet of polyethylene plastic.

8. The apparatus according to claim 3, further including means for delineating the location and depth of said contaminated area prior to locating said trench.

9. The apparatus according to claim 3, further including means for treating said volatile contaminates by mechanical, thermal, chemical, or biological means to render said contaminants harmless.

10. The apparatus according to claim 3, wherein said first conduit is located adjacent to the water table associated with said contaminated area.

11. The apparatus according to claim 3, wherein said third conduit includes a borehole, having a downwardly extending aperture and a bottom, adjacent to said contaminated area; at last the lower portion of said borehole adjacent to said contaminated area filled with a gas permeable fill material, said gas permeable fill material permitting said fluid to flow from said fourth conduit into said contaminated area adjacent to said borehole; and sealing means upon the upper portion of said borehole for preventing the entry air or other fluids from the surface of said borehole into said gas permeable fill material.

12. A process for collecting volatile contaminates from the vadose zone of a contaminated area, said process comprising the steps of:

(a) locating an elongated trench, having a pair of downwardly extending walls and a bottom, adjacent to said contaminated area;

(b) placing a first conduit within said trench, said conduit having a perforated portion for receiving said volatile contaminates;

(c) connecting a second conduit to said first conduit, said second conduit having a imperforate portion for conducting said volatile contaminates from said first conduit to the surface of said trench;

(d) filling at least two thirds of the lower portion of aid trench adjacent to said contaminated area with a gas permeable fill material, said gas permeable fill material permitting said volatile contaminates to flow from said contaminated area adjacent to said trench into said first conduit;

(e) sealing the upper portion of said trench for preventing the entry air or other fluids from the surface of said trench into said gas permeable fill material;

(f) placing a third conduit positioned adjacent to said trench, said third conduit having a perforated portion for supplying a fluid; and (g) connecting a fourth conduit to said third conduit, aid fourth conduit having a imperforate portion for conducting said fluid from the surface of aid trench to said third conduit, whereby said fluid is drawn across said contaminated area so that said volatile contaminates are carried with said fluid to the surface, wherein said third conduit includes an elongated trench, having a pair of downwardly extending walls and a bottom, adjacent to said contaminated area; at least the lower portion of aid trench adjacent to said contaminated area filled with a gas permeable fill material, said gas permeable fill material permitting said fluid to flow from said fourth conduit into said contaminated area adjacent to said trench; and sealing means upon the upper portion of said trench for preventing the entry air or other fluids from the surface of said trench into said gas permeable fill material.

13. A process for removing volatile contaminates from the vadose zone of a contaminated area, said process comprising the steps of:

(a) locating an elongated trench, having a pair of downwardly extending walls and a bottom, adjacent to said contaminated area;

(b) placing a first conduit positioned within said trench, said conduit having a perforated portion for receiving said volatile contaminates;

(c) connecting a second conduit to said first conduit, said second conduit having a imperforate portion for conducting said volatile contaminates from said first conduit to the surface of said trench;

(d) filling at least two thirds of the lower portion of said trench adjacent to said contaminated area with a gas permeable fill material, said gas permeable fill material permitting said volatile contaminates to flow from said contaminated area adjacent to said trench into said first conduit;

(e) sealing the upper portion of said trench for preventing the entry air or other fluids from the surface of said trench into said gas permeable fill material;
(f) pumping said volatile contaminates from said vadose zone, through at least one of said side walls of said trench and aid gas permeable fill material, into said first conduit, and through said second conduit to the surface of said trench;
(g) placing a third conduit adjacent to said trench, said conduit having a perforated portion for supplying a fluid;
(h) connecting a fourth conduit to said third conduit, said fourth conduit having a imperforate portion for conducting said fluid from the surface of said trench to said third conduit; and
(i) pumping said fluid from surface of said trench, through aid fourth conduit, into said third conduit, through said gas permeable fill material and at least one of said side walls of said trench, and said vadose zone, whereby said fluid from said second pump means is drawn across said contaminated area by said pump means so that said volatile contaminates are carried with said fluid to the surface, wherein said third conduit includes an elongated trench, having a pair of downwardly extending walls and a bottom, adjacent to said contaminated area; at least the lower portion of said trench adjacent to said contaminated area filled with a gas permeable fill material, said gas permeable fill material permitting said fluid to flow from said fourth conduit into said contaminated area adjacent to said trench; and sealing means upon the upper portion of aid trench for preventing the entry air or other fluids from the surface of said trench into said gas permeable fill material.

* * * * *